United States Patent [19]

Wang

[11] Patent Number: 4,468,728
[45] Date of Patent: Aug. 28, 1984

[54] DATA STRUCTURE AND SEARCH METHOD FOR A DATA BASE MANAGEMENT SYSTEM

[75] Inventor: Chung C. Wang, Naperville, Ill.

[73] Assignee: AT&T Bell Laboratories, Murray Hill, N.J.

[21] Appl. No.: 277,103

[22] Filed: Jun. 25, 1981

[51] Int. Cl.³ .......................... G06F 9/00; G06F 7/00
[52] U.S. Cl. .................................................. 364/200
[58] Field of Search ... 364/200 MS File, 900 MS File

[56] References Cited

U.S. PATENT DOCUMENTS 4,177,514 12/1979 Rupp .................................... 364/200
4,318,184 3/1982 Millett et al. ....................... 364/900
4,390,945 6/1983 Olsen et al. ......................... 364/200

OTHER PUBLICATIONS

"Dynamic Hashing", *BIT*, vol. 18, (1978).
57 *Bell System Technical Journal*, No. 2, p. 230 et seq.

*Primary Examiner*—Gareth D. Shaw
*Assistant Examiner*—John G. Mills
*Attorney, Agent, or Firm*—J. W. Herndon

[57] ABSTRACT

A data structure and search method for a data base management system. The structure and method allow the locating of a stored record in a massive system in a controlled and small number of mass memory accesses. The data structure is arranged into a plurality of search trees, each defining patent nodes and terminal nodes. The nodes of a tree are hierarchically arranged, and the trees are hierarchically arranged as a whole into levels. The initial search tree and an initial subset of trees, in some cases, are designed to be maintained in a main fast access memory. The remaining trees are kept in mass memory. A plurality of first storage files maintained in the mass memory are associated with terminal nodes of each of the trees except the final trees in the hierarchical structure. Terminating storage files, which are the ultimate repository for information, are associated with terminal nodes of the final trees. An input search parameter is partitioned into a plurality of subparameters, one for each level of search trees. The subparameters are used to search a tree in each level of the data structure until the location of a terminating file is determined.

10 Claims, 10 Drawing Figures

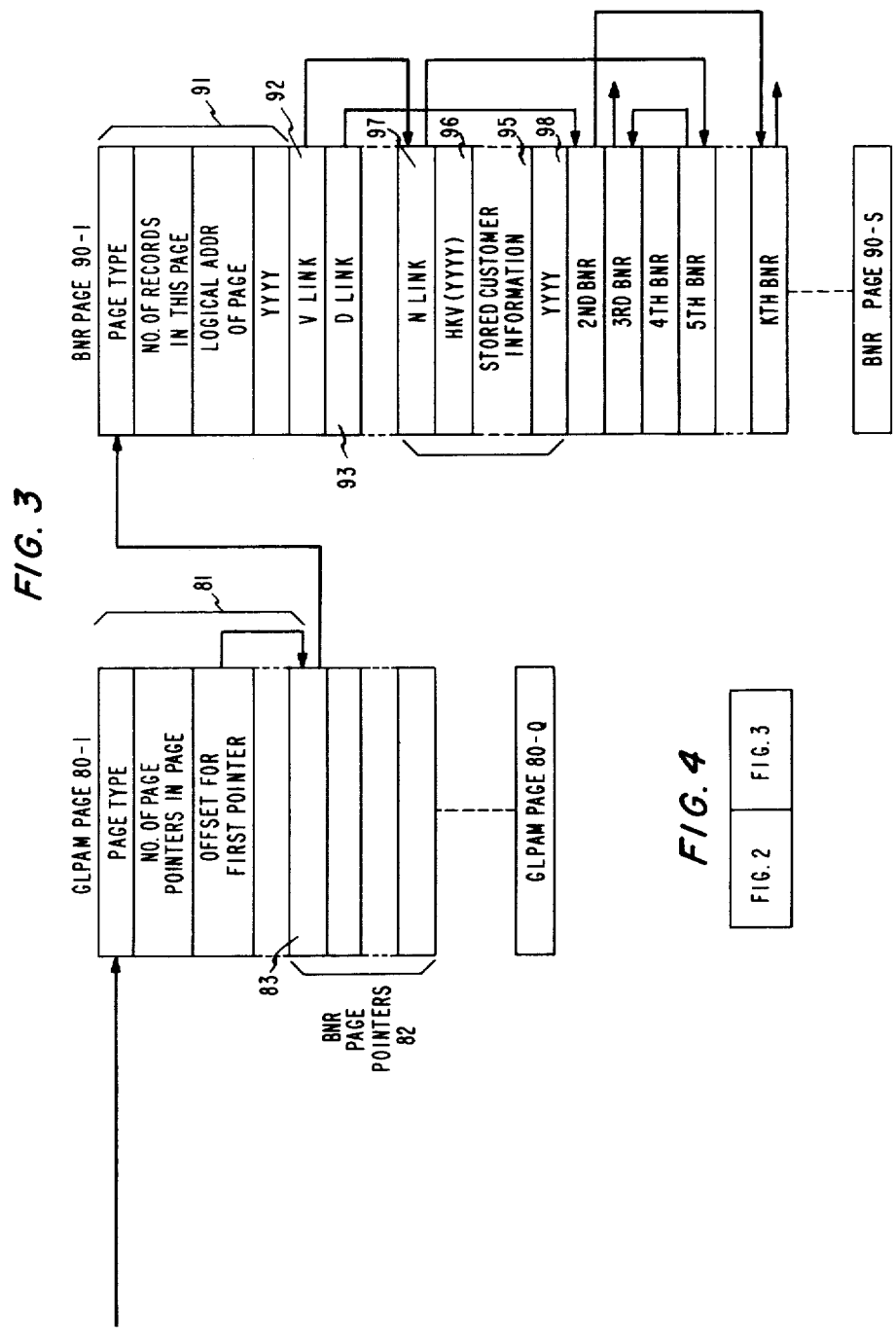

FIG. 5
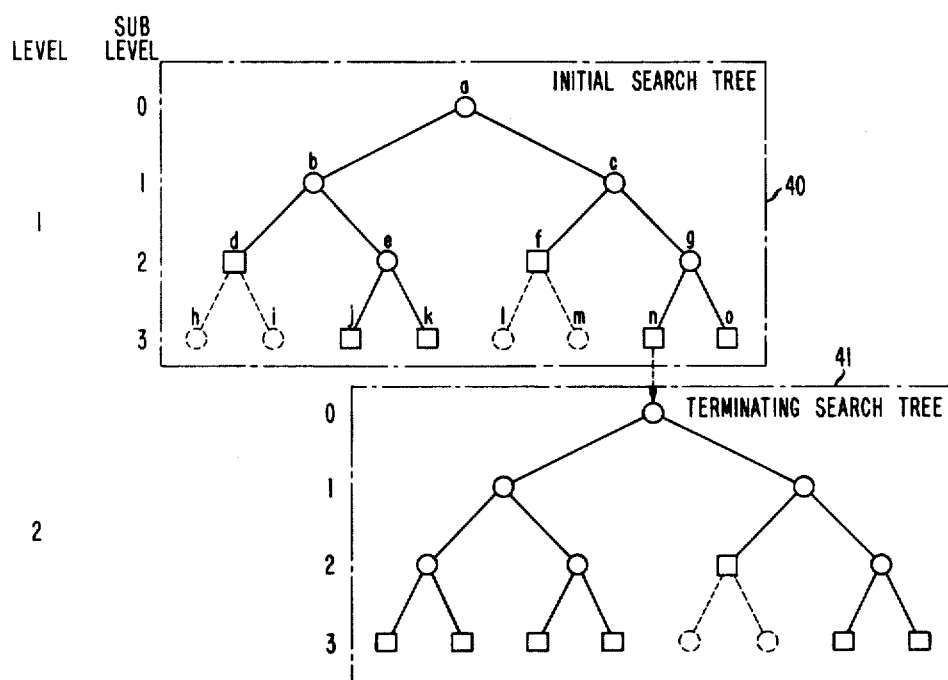
FIG. 6
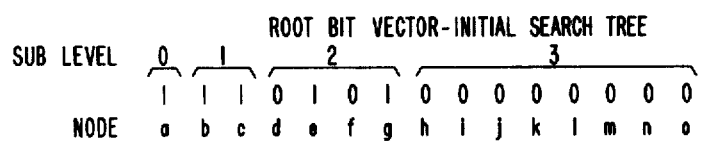
FIG. 7
BIT VECTOR-TERMINATING SEARCH TREE
1   11   1101   00000000

DATA STRUCTURE AND SEARCH METHOD FOR A DATA BASE MANAGEMENT SYSTEM

TECHNICAL FIELD

The invention relates to data storage systems in general and, in particular, to data management systems designed for massive storage, large throughput operation.

BACKGROUND OF THE INVENTION

Beginning in the early 1970s, the Automated Intercept System (AIS) was installed in some Bell System telephone offices to provide automated announcements to callers who had reached out-of-service or changed telephone numbers. This service was and is supported by a data base system called the File Administration System (FAS). The FAS is a minicomputer processing system and contains customer files which store customer information such as new telephone numbers or information geared to cause automatic interception of calls to certain customers. The stored customer information is accessible by using customer telephone numbers as an input search parameter.

In 1976 the Bell System introduced the Common Channel Interoffice Signaling System (CCIS) into the Bell network. CCIS is a packet data switching and transmission system which is overlaid onto the telephone network and provides signaling capability for the establishment of telephone calls. CCIS is described in 57 Bell System Technical Journal, No. 2, at page 230 et seq. CCIS, in conjunction with the stored program controlled network which is evolving in the Bell System, has the capability to offer a multitude of new, enhanced and sophisticated telephone services. Some examples are Auto Bill Calling, new "800" number type services, and Person Locator services. Auto Bill Calling with replace collect, credit card, and third number billing station-to-station calling. This service is described in U.S. Pat. No. 4,162,377 which issued to A. B. Mearns on July 24, 1979. New "800" service is described in U.S. Pat. No. 4,191,860 which issued to R. B. Weber on Mar. 4, 1980. Person Locator service is described in U.S. patent application Ser. No. 113,383, filed by D. S. Jordon et al on Jan. 18, 1980.

The provision of these new services requires the use of a data management system by telephone companies to store massive amounts of customer information. Ultimately, information would be stored for each customer of a given telephone company. This translates to magnitudes in the order of 500 million bytes of information for one data management system. It is anticipated that large numbers of accesses to the customer information will be required to obtain or to change the stored information. For reasons of economy, it is desirable to use a minicomputer processing system such as the system referred to earlier, while still providing massive storage and access capacity. To accomplish these objectives, a need exists to improve the known data management system data structures and search techniques.

One known search method is briefly described by Per-Ake Larson in an article "Dynamic Hashing" in Bit, Volume 18, 1978, pp. 184-201. To reduce the number of disc accesses required to locate any data record, thereby to improve efficiency and data throughput, a single binary bit string is used to define the location of stored information relating to an input search parameter. The ones and zeros of the bit string define the path through a hierarchical tree to locate the stored data. Unfortunately, however, this techique results in a bit string that is so large for a reasonably large data management system that excessive main storage is required to store the string. Moreover, even if the string is maintained in secondary memory, such as disc memory, the length of the string still determines the size of required main memory when the string is read. Otherwise, the string must be read piecemeal, which increases the required number of disc accesses.

SUMMARY OF THE INVENTION

The above-stated problems are solved in a data management system and search method in which the system comprises a main memory, a large capacity secondary, and processor. The memories are organized into a data structure including a plurality of first storage files and a plurality of terminating storage files located in the secondary memory, and a plurality of hierarchical search trees. Ones of the search trees are also hierarchically arranged into an initial tree located in the main memory and a plurality of terminating trees located in the secondary memory. The initial and terminating search trees each defines a plurality of parent and leaf, or terminal, nodes. The parent nodes contain information that defines the paths to the terminal nodes. Each of the terminal nodes of the initial and terminating trees correspond to a logical memory address or one of the first and the terminating files, respectively.

Each of the files associated with the terminal nodes of the initial tree contains an address pointing to one of the terminating trees in the data structure. Each of the files associated with the terminal nodes of the terminating trees contains stored data relating to an input search parameter. The processor partitions an input search parameter into a plurality of subparameters and consecutively searches ones of the trees starting with the initial search tree using a different one of the subparameters for each tree search until a terminating file is found.

The foregoing summarized arrangement allows any file relating to an input search parameter to be obtained in only a few disc accesses, or will be described, while at the same time reducing the amount of main storage required for storing the data structure. In the preferred embodiment, this is accomplished by maintaining the initial search tree and related information in main memory and the terminating search trees and related information in disc memory. The terminating storage files are stored in disc memory. The arrangement allows a balancing between the required main memory size and the number of disc accesses required to reach stored customer data. With an input search parameter partitioned into two subparameters, as is done in the preferred embodiment, any terminating file can be obtained with no more than three disc accesses.

BRIEF DESCRIPTION OF THE DRAWINGS

FIGS. 2 and 3, when arranged according to FIG. 4, illustrate the data structure of the data base management system containing a plurality of first storage files, including an initial storage file (root page and root logical to physical address translation pages), intermediate storage files (billing number group pages and general logical to physical address translation pages) and terminating storage files (billing number record pages), wherein a hierarchical search tree structure is contained within the above files, as will be described.

FIG. 5 illustrates conceptually a hierarchical search tree structure including an initial search tree and a terminating search tree.

FIGS. 6 and 7 show illustrative binary bit vectors that describe the nodal states of the initial and terminating search trees of FIG. 5.

DETAILED DESCRIPTION

Figure 1:
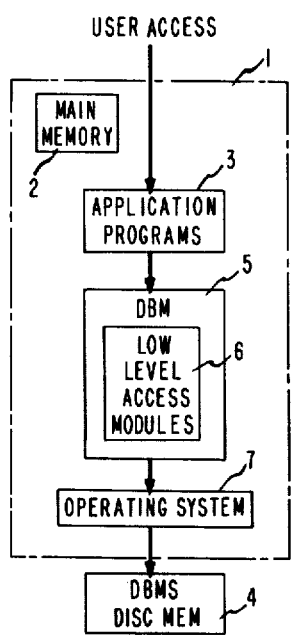
FIG. 1 discloses in block diagram form the general organization of a data management system.

FIG. 1 is a general block diagram illustration of the Data Base Management System (DBMS) of the present invention. The DBMS generally comprises a processor 1, a main memory 2 which is part of the processor and which stores the program that controls the processor in its operations, and a DBMS disc memory 4. Processor 1 in FIG. 1 is a PDP 11/70 computer supplied by the Digital Equipment Corporation (DEC) in the preferred embodiment. The blocks internal to processor 1 in FIG. 1 other than memory 2 represent program modules of the DBMS. The modules include a set of application programs 3, an operating system 7, and the data base manager (DBM) 5. Data base manager 5, in turn, includes a plurality of low level access modules, ones of which are activated depending on query types and which, in turn, communicate with the operating system 7 to access or store data in the memory 4. Operating systems as well known and are described, for example, in *Operating Systems—A Systematic View,* by W. S. Davis, Addison-Weslay Publishing Company, Inc., 1977.

Figure 2:
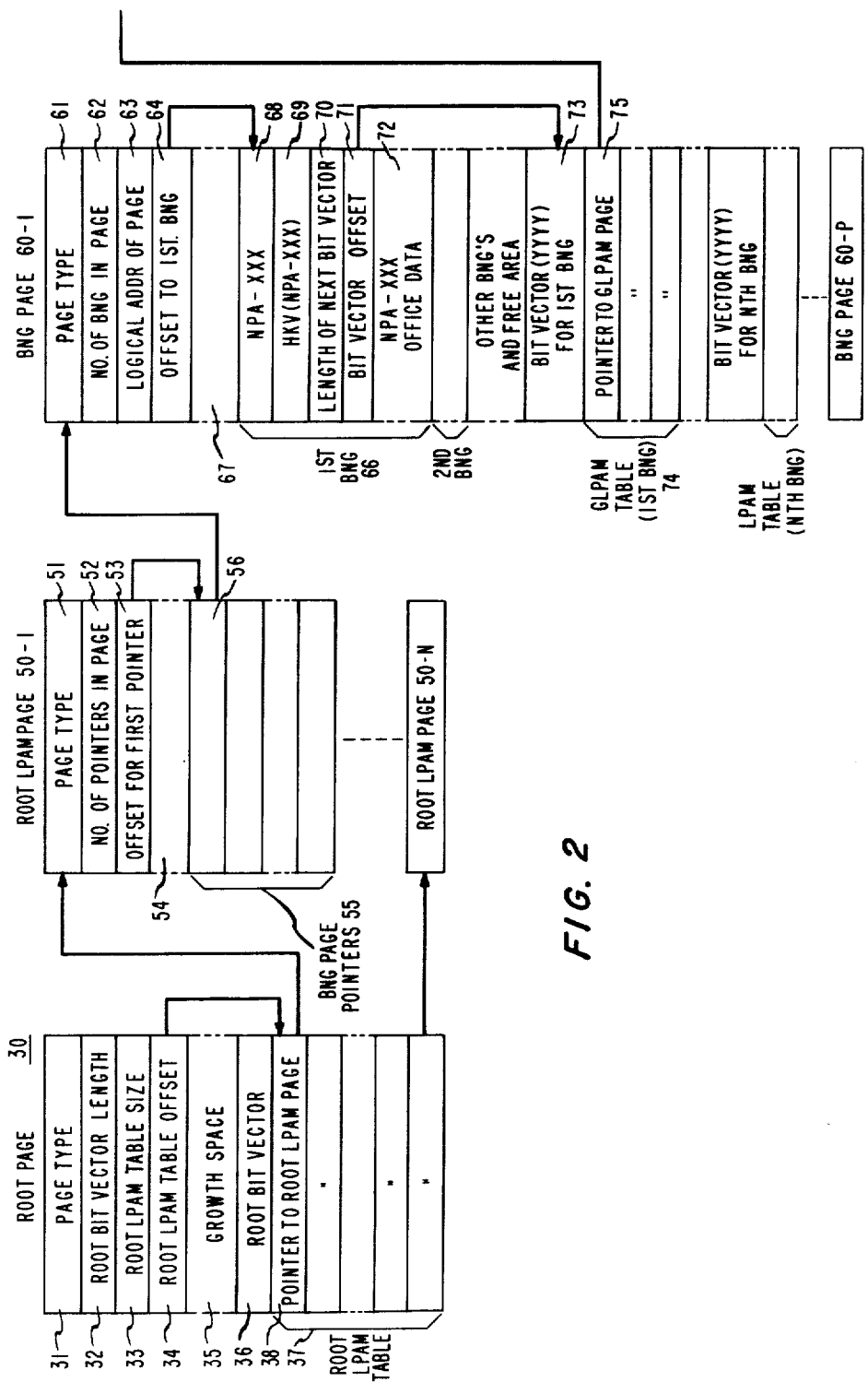

A user activates a query to the DBMS by inputting an appropriate message to computer 1, which activates an appropriate application program 5. The message may be of a type requesting information about a particular customer's service, or it may be designed to update certain information in a customer's record. The activating message indentifies its type and includes the customer's telephone number NPA-XXX-YYYY as the input search parameter, where NPA is the numbering plan area code (also called area code), XXX identifies the telephone office serving the customer, and YYYY is the customer's line number in the office. The appropriate activated application program responds by sending an "open data base" command to the DBM 5 which includes the search parameter NPA-XXX-YYY and the query type. The DBM 5 utilizes the NPA-XXX-YYYY search parameter to ascertain the location of the customer record in DBMS disc memory 4. In accordance with the invention, FIGS. 2 through 4 illustrate the data structure used in the preferred embodiment which allows the efficient searching for a customer's record and the fetching or updating of same. The data structure includes five types of pages. FIG. 2 shows a root page 30, a plurality of root LPAM (logical to physical address map) pages 50 and a plurality of BNG (billing number group) pages 60. FIG. 3 shows a plurality of GLPAM (general logical to physical address map) pages 80, and BNR (billing number record) pages 90. BNG pages 60 in conjunction with the GLPAM pages 80 constitute a plurality of first storage files which are associated with an input search subparameter NPA-XXX. The BNR pages 90 constitute terminating files and are associated with line number subparameters YYYY of an associated BNG. The root page 30 and a root LPAM page 50 are used to initiate a search. These pages contain sufficient information to allow the program to locate an appropriate BNG page 60. Because the root page 30 and root LPAM pages 50 are of limited size in this data structure design, they are maintained in main memory 2 for rapid access.

A BNG page 60 and a GLPAM page 80 are located by means of an examination of an initial search tree, as will be seen. The information in the BNG page is used for a second search using a second search tree to locate a BNR page 90 containing information pertaining to the customer in question. The initial search is based upon a hashing of a subparameter NPA-XXX of the customer telephone number in question. The second search is based upon a hashing of the subparameter YYYY, which is the telephone line identification of the telephone number.

There are potentially many BNG 60, GLPAM 80, and BNR 90 pages. For this reason these pages are maintained in DBMS disc memory 4.

As will be seen, the data structure summarized above allows any customer BNR to be located and accessed with no more than three disc accesses in this embodiment. After the initial search, one disc access obtains an appropriate BNG page 60; a second disc access obtains the associated GLPAM page 80. A third access obtains the appropriate BNR page 90.

The data structure of FIG. 2 is now described in more detail.

Root page 30 begins with a page type word 31 which contains a prescribed binary number identifying the page as the root page. The next word 32 contains the length in terms of binary bits of a root bit vector described below. Word 33 contains the size (number of entries) of the root LPAM table 37, which is contained in the root page. Word 34 contains an offset value which when added to the beginning address of the root page gives the address of the root LPAM table 37. This is symbolically indicated by an arrow drawn from word 34 to the beginning word of the LPAM table in FIG. 2. Following word 34, is a block of growth space words 35.

Word 36 contains a root bit vector. This vector is a string of binary bits representing an initial search tree. The bit vector can best be understood from FIGS. 5 through 7. FIG. 5 shows an illustrative symbolic initial search tree 40 and a terminating search tree 41. The search trees are arranged to form a hierarchical structure containing a plurality of search levels (two levels in this embodiment). The initial search tree 40 is at level 1 of the structure; and the terminating search trees, such as 41, are at level 2 in this embodiment as shown at the left of FIG. 5. Of course, the search tree structure could be arranged to have as many levels as desired. FIG. 6 shows the root bit vector that would be associated with tree 40 and stored in word 36 of the root page for this example. FIG. 7 shows a bit vector that would be associated with terminating search tree 41. The circles and squares in search tree 40 represent tree nodes. There is a bit position in the bit vector for each node of the tree. A circular node, such as b in tree 40, FIG. 5, is called a parent node because it defines the point of access to its subsidiary nodes d and e. A square node, such as node d, is called a terminal node because it represents an actual page of information that is stored in the disc memory 4. The nodes of trees 40 and 41 are contained in different sublevels indicated at the left of FIG. 5. Tree 40, for example, starts with a root node a which is at sublevel 0. Nodes b and c are at sublevel 1, and so on.

FIG. 6 shows the bit vector for illustrative tree 40 of FIG. 5. This is an example of the bit vector 36 of root page 30 in FIG. 2. Parent nodes are represented by logical 1s, and terminal nodes are represented by logical 0s. Thus, root node a is represented by a 1; parent nodes b and c by 1s; and nodes d, e, f, and g by the substring 0101 since d and f are terminal nodes. The amount of information stored in disc memory 4 may grow or shrink as customer records are added or deleted in the normal course of events. Dotted nodes, such as h and i, represent nodes that will be created if and when the page associated with its "parent" such as terminal node d, overflows its storage space in memory during growth, requiring that the page be split into two pages. The length of a bit vector is determined by the number of bits necessary to describe each node in each sublevel through the highest numbered sublevel containing a terminal node. Uncreated nodes at that sublevel and at lower number sublevels are treated as terminal nodes in the bit vector.

A terminating file in tree 40, such as associated with terminal node n, contains an address link (pointer) to the beginning of another tree which, in the illustrative embodiment, is a terminating search tree such as 41 in FIG. 5. In FIG. 5 this is illustrated by the dotted arrow extending from terminal node n to search tree 41. In general, there exists a separate terminating search tree for each terminating node in tree 40. The bit vector shown in FIG. 7 which represents terminating search tree 41 in the actual data structure is stored in one of the BNG pages, as will become apparent.

Root page 30 ends with a root LPAM table 37 which contains a plurality of words, such as 38, each of which contains an address pointing to one of a plurality of root LPAM pages 50-1 through 50-N in FIG. 3. For example, pointer 38 contains the address of root LPAM page 50-1. Pointer 38 could point to any of the root LPAM pages in any given case, depending on how the data base has grown.

Each of the root LPAM pages 50 contains pointers 55 to a plurality of BNG pages 60-1 through 60-P. Taking root LPAM page 50-1 as an example, it includes a page type word 51, a word 52 containing the number of BNG pointers stored in this page, an offset in word 53 which locates the beginning word 56 of the BNG page pointers 55, and an area 54 containing other information not pertinent here. Each of the BNG page pointers 55 contains an address of one of the BNG pages 60-1 through 60-P shown in FIG. 4.

A BNG page, such as 60-1, stores information about a plurality of BNGs and also includes a page type word 61, a word 62 identifying the number of BNGs in the page, a word 63 containing the logical address of the page (logical address is discussed below), a word 64 containing a pointer to the first BNG 66 of the page, and an area 67 storing other nonpertinent information. Each BNG, such as 66, includes in word 68 the numbering plan area and telephone office code NPA-XXX with which it is associated, a hashed key value (HKV), to be explained, in word 69 which in conjunction with the initial search tree leads to this page, the binary bit length of a bit vector associated with a terminating search tree is contained in word 70, a relative offset pointer 71 pointing to the terminating bit vector for this BNG and data in area 72 describing parameters of the telephone office NPA-XXX. Each BNG in the page also has associated with it and stored in the page the terminating bit vector, such as 73, referred to above. This bit vector might be the vector shown in FIG. 7 which corresponds to terminating search tree 41 in FIG. 10. Following the bit vector for a BNG is a GLPAM table, such as 74, for the BNG. Each word of the GLPAM table, such as 75, contains a pointer pointing to one of a plurality of GLPAM pages 80-1 to 80-Q.

With reference to GLPAM page 80-1, each GLPAM page contains a header 81 of information which is self-explanatory at this point, plus a plurality of pointer words 82. Each of these words, such as 83, points to one of a plurality of BNR pages 90-1 through 90-S.

A BNR page 90 stores a plurality of BNRs each of which contains information pertaining to a given customer. In addition, a BNR page contains a self-explained header 91 and two words 92 and 93 which contain a V link pointer and a D link pointer, respectively. The V link is the initial pointer to a linked list of BNRs on the page containing active stored customer information. In the example of FIG. 3, V link 92 points to BNR 94. BNR 94 stores customer information in 95 and the HKV of the line number YYYY in 96. In addition, BNR 94 contains an N link pointer 97 which points to the next BNR in the list storing active customer information. The D link word begins a list of BNRs that contain no valid customer information at this time and are thus available to be added to the active BNR list as needed. This list is formed by the D link word and the N link word of the vacant BNRs in the same manner as the active list.

Figure 8:
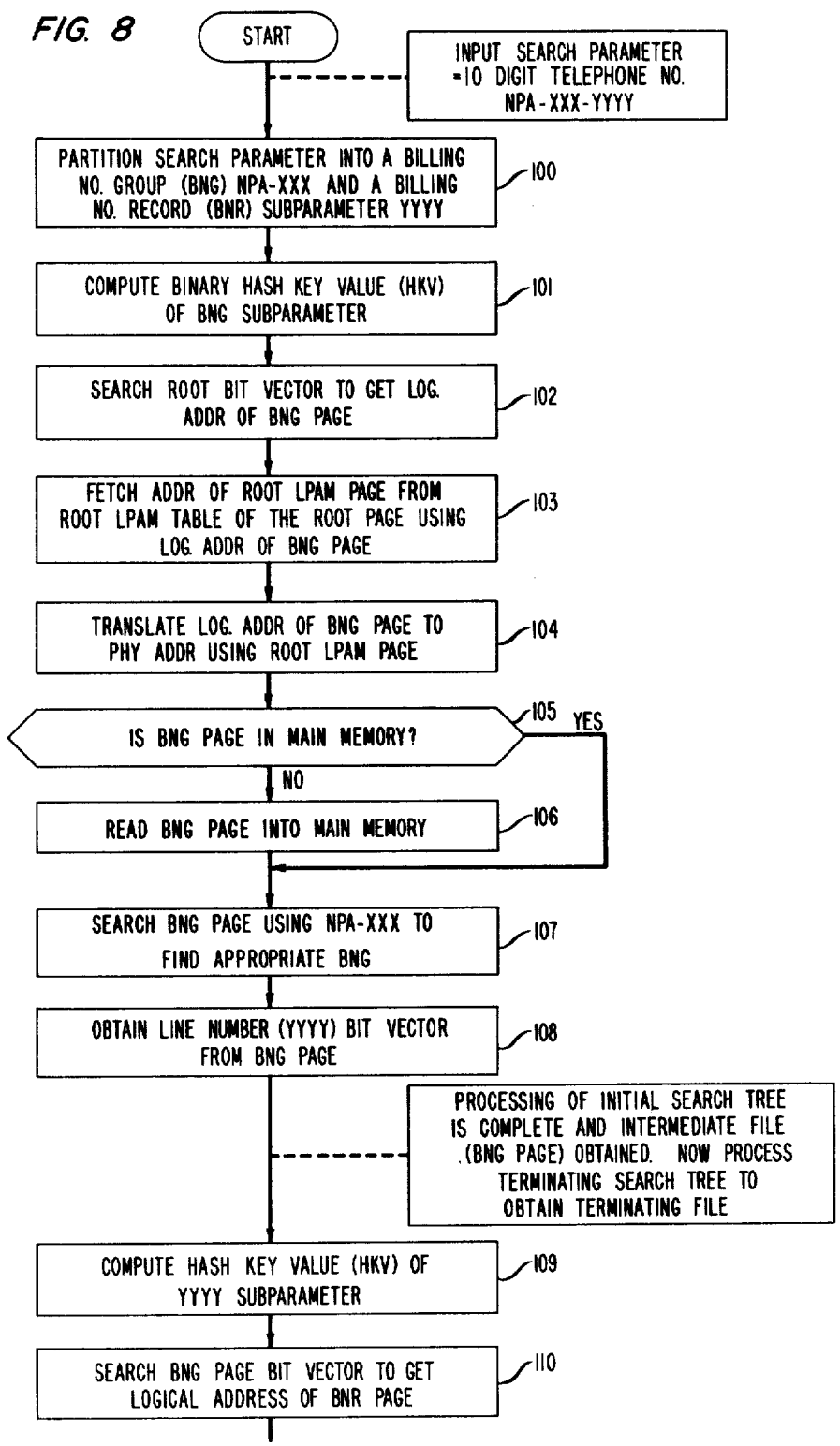
FIGS. 8 and 9, arranged according to FIG. 10, show an illustrative flow diagram of part of the program that controls the processor of FIG. 1 in the examination of the data structure to locate customer records.
Figure 9:
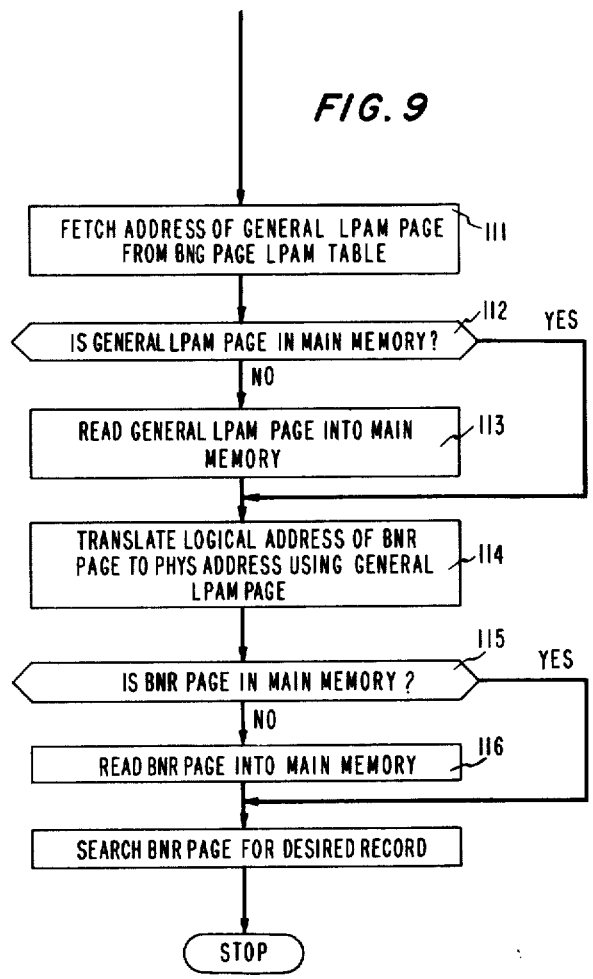
Figure 10:
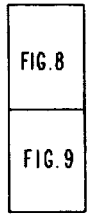

The program which performs a search for customer information is now described with reference to the flowchart in FIGS. 8 and 9, arranged according to FIG. 10. The program is entered at START with the customer telephone number NPA-XXX-YYYY in question as a search parameter. At step 100, the telephone number is first partitioned into two subparameters, NPA-XXX and YYYY. Partitioning may be performed in a variety of ways. One common way is to store the BNG subparameters NPA-XXX and the BNR subparameters YYYY in different words of main memory 2. The BNG subparameter NPA-XXX is hashed at step 101 to produce a BNG HKV, which is a unique, arbitrarily long string of 0s and 1s. Many hashing functions are satisfactory. In fact, the binary representation of each of the subparameters could be used directly without hashing if desired. Ideally, however, a hashing function is selected that will cause the data base to grow as evenly as possible. At step 102 the bits of the HKV are examined from the lowest order bit toward higher order bits and used to direct the program in its search of the root bit vector in word 36 of the root page. A 1 in a bit of the HKV tells the program to move down one level to the right in the search tree represented by the bit vector. A 0 in a bit of the HKV means to move down one level to the left in the tree. With reference to tree 40 in FIG. 10, assume that the HKV is a binary sequence ending in lower order bits 1010011. Starting with the root node a, the right-most 1 of the HKV directs the program to examine the bit in the bit vector associated with node c to determine if it is a parent or terminal node. In FIG. 6, this is equivalent to examing the right-most bit associated with sublevel 1. Since this bit is a 1, meaning a parent node, the program proceeds according to the second right-most bit of the KHV. This bit is also a 1 which directs the program down to the right to sublevel 2 in the tree 40. This is associated with node g. Reference to the corresponding bit in the bit vector in FIG. 4 tells the program that node g is also a parent. The next bit of the HKV is a 0 and directs the program downward to the left in the tree to node n. The bit in the bit vector corresponding to node n is a 0, which informs the program that the initial search for the BNG page is ended. The bits of the HKV that were used in the search form a logical address of the desired BNG page. In the example, the logical address is 011. At steps 103 and 104 of FIG. 13, the logical address is translated into a physical memory address of the BNG page associated with the NPA-XXX. This is accomplished by dividing the logical address by a number equal to [the byte size of a root LPAM page 50-the byte size of the header of the page (works 51 through 54)] to give a quotient and remainder. The quotient is used as an index into the root LPAM table 37 in FIG. 2 to get a pointer to a root LPAM page. The remainder is used as an index into the BNG page pointers 55 of the LPAM page to get a pointer to the appropriate BNG page 60. The BNG page may already be in main memory as determined by the program at step 105. Otherwise, the BNG page is read from DBMS disc memory 4 into main memory at step 106. The BNGs are next searched for the correct one by comparing the NPA-XXX search parameter with the NPA-XXX information stored in each BNG such as in word 68. This is accomplished at step 107.

The above operations require at most one disc memory access in the preferred embodiment. At this point the appropriate line number (YYYY) bit vector is obtained from the BNG that was found above by using the bit vector offset in word 71 of the page. With reference to FIG. 5, the program is now at the link between search trees 40 and 41; i.e., it has located the terminating search tree 41 (YYYY bit vector) and is ready to search it to locate the customer's BNR. Essentially the same steps as were described with respect to the initial search tree are performed. The line number YYYY is hashed at step 109 to produce a BNR HKV. The bit vector from the appropriate BNG is searched at step 110 in the same manner as described for the initial search tree to produce a logical address of the desired BNR page. This logical address is converted into a quotient and remainder as described. The quotient is used together with the offset in word 71 of the BNG to index into the appropriate GLPAM table, such as 74, in the BNG page to obtain a pointer to an appropriate GLPAM page 80. This is accomplished at step 111. At steps 112 and 113, the GLPAM page is read into main memory if it is not already present there. The remainder of the logical address division is then used as an index, at step 114, into the BNR page pointers, such as 82, to obtain a pointer to the appropriate BNR page. At steps 115 and 116, the appropriate BNR page is read into main memory if necessary. The V link word 92 of the page and the N link word 93 are used to access the stored BNRs in succession. The input line parameter YYYY is compared to the line number stored in word 98 of each BNR until the desired BNR is obtained.

The terminating search above consumed at most two disc accesses, one to fetch a GLPAM page and a second to fetch the appropriate BNR page. This is so, in part, because of the partitioning of the input search parameter NPA-XXX-YYYY into 2 subparameters. Alternatively, three or more subparameters could be used. NPA-XXX-YYYY could, for example, be partitioned in subparameters NPA, XXX, and YYYY and a data structure having three search trees utilized according to the principles of the invention described.

It is to be understood that the above-described arrangement is merely illustrative of the application of the principles of the invention and that other arrangements may be devised by those skilled in the art without departing from the spirit and scope of the invention.

What is claimed is:

1. A data base management system including
   a processor,
   a main memory (2),
   a large storage secondary memory (4), and
   a data structure contained in the main and secondary memories comprising
   a plurality of storage files (BNG pages 60, GLPAM pages 80, BNR pages 90) contained in the secondary memory, and
   a plurality of search trees (bit vectors 32, 36 and 73) hierarchically arranged in a plurality of search levels beginning with an initial tree (40) contained in the main memory, each tree containing ordered data defining parent nodes and terminal nodes of the tree, wherein a numerical representation of a path through parent nodes of the tree to reach any said terminal node of the tree defines a logical memory address of one of the storage files, and each terminal node of the search trees in a last search level defines a logical memory address of a terminating one of the storage files, and in which each of the storage files associated with the terminal nodes of the search trees except the trees in the last search level contains a link to one of the search trees in the next search level and each of the storage files associated with the terminal nodes of the search trees in the last search level contains stored information pertaining to a unique input search parameter, and the processor comprises program means for partitioning an input search parameter into a subparameter for each search level and for consecutively searching a linked one of the trees in each search level, starting with the initial tree, using a different one of the subparameters for each tree search until a terminating one of the storage files associated with the last search level is found.

2. The invention of claim 1 wherein each of the search trees comprises a binary bit string having one bit per node of the search tree and in which one binary state of a said bit defines a parent node and the other binary state of a said bit defines a terminal node.

3. The invention of claim 2 in which the data structure further comprises a first translation file (root LPAM table 37 and root LPAM pages 50) in the main memory for translating a logical memory address associated with the initial search tree into a physical memory address of one of the storage files; a plurality of second translation files (GLPAM tables 74 and GLPAM pages 80) in the secondary memory, each for translating a logical memory address associated with one of the terminating search trees into a physical memory address of one of the terminating files.

4. The invention of claim 3 wherein each translation file comprises a table (LPAM table 37, GLPAM table 74) of physical memory addresses each pointing to a page (50, 80) containing another plurality of physical memory addresses and wherein each said table is indexable by a prescribed portion of the associated logical address to obtain an associated one of said pages, and said one page is indexable by the remaining portion of the logical address to obtain an address of a said storage file.

5. The invention of claim 1 wherein the input search parameter is a plurality of telephone number digits identifying a numbering plan area (NPA), a telephone office (XXX), and a telephone line (YYYY) within the office, a first subparameter comprises the digits NPX-XXX associated with the initial search tree, and a second subparameter comprises the digits YYYY associated with search trees in a second search level.

6. A method of searching a memory (2, 4) to locate information pertaining to an input search parameter in a data base management system, comprising the steps of
  A. partitioning the search parameter into a plurality of subparameters,
  B. searching a first bit vector in accordance with a first one of the subparameters to generate a logical address of a stored file pertaining to the first subparameter,
  C. translating by means of a stored translation table the logical address into a physical memory address of the file,
  D. obtaining from the file another bit vector,
  E. repeating steps B through D for each of the remaining subparameters except the last remaining subparameter using the bit vectors obtained in step D, and repeating steps B and C for the last remaining subparameter, wherein the file whose physical address has been identified for the last remaining subparameter contains stored information pertaining to the input search parameter.

7. The invention of claim 6 further comprising the steps of
  hashing each of the subparameters according to a prescribed function to generate a hashed key value (HKV) for each subparameter, and
  searching each bit vector using a prescribed different one of the HKVs for each bit vector search to define the search path through the bit vector.

8. A method of searching a data structure to locate stored records pertaining to input search parameters in a data base management system having a main random access memory and a large capacity, slow access secondary memory, wherein the data structure comprises
  a plurality of search trees each represented by a bit vector and each defining a plurality of terminal nodes, said search trees being arranged into a hierarchy having at least an initial level defined by an initial search tree located in the main memory, and a terminating level containing plural ones of the search trees located in the secondary memory, in which each terminal node of the initial tree contains a link to another search tree in the next successive level of the hierarchy, and each terminal node of each tree in the terminating level contains a link to a page of stored information pertaining to a different input search parameter, said method being characterized by the steps of
  partitioning an input search parameter into a plurality of subparameters equal in number to the number of levels in the hierarchy of search trees,
  hashing each subparameter to generate a search string for each level of the hierarchy,
  searching the initial search tree using a prescribed one of the search strings to locate a terminal node,
  obtaining the link associated with the last-mentioned node to a search tree in the next level of the hierarchy, and
  repeating the last two steps with respect to each level in the hierarchy, using a different one of the subparameters for each level until a terminal node of a tree in the terminating level is found.

9. A method of searching a data structure to locate stored records pertaining to input search parameters in a data base management system, wherein the data structure comprises
  a root page (30) containing an initial binary root bit vector (36) in which each bit defines a node of a hierarchical search tree and the state of the bit defines whether the node in a parent node or a terminal node, and a root table 37 having memory address pointers to the next mentioned root logical to physical address pages,
  a plurality of root logical to physical memory address (LPAM) pages (50) each containing billing number group memory address pointers (55) to the next-mentioned pages,
  a plurality of billing number group (BNG) pages (60) each containing a plurality of BNGs, each BNG having associated with it a terminating bit vector (73) and a general LPAM table (74) having a plurality of memory address pointers to ones of the next mentioned pages,
  a plurality of general LPAM pages (80) each containing a plurality of memory address pointers (83) of ones of the next-mentioned pages, and
  a plurality of billing number record (BNR) pages (90) each having a plurality of records of information pertaining to one of the input search parameters, and said method comprises the steps of
  partitioning a said input search parameter into two subparameters,
  hashing the subparameters to generate binary search strings,
  interrogating ones of the bits of the initial root bit vector along a path of the vector determined by the successive bits of a prescribed one of the search strings until a terminating node is found, wherein the search string bits used in locating the terminal node defines a logical memory address,
  indexing into the root LPAM table with a prescribed part of the logical address to obtain an address of one of the root LPAM pages,
  indexing into said one of the LPAM pages with the remaining part of the logical address to obtain an address pointer to one of the BNG pages,
  reading said one BNG page from memory, searching said one BNG page for a BNG pertaining to one of the subparameters associated with said prescribed one of the search strings,
  obtaining the terminating binary bit vector from the last-mentioned BNG,
  interrogating ones of the bits of the second bit vector along a path of the vector determined by the successive bits of the remaining one of the search storage until a terminating node is found, wherein the search string bits used in locating the terminal node defines a second logical memory address,
  indexing into the general LPAM table of the last-mentioned BNG using a prescribed part of the second logical address to obtain a memory address to one of the general LPAM pages,
  indexing into said one general LPAM pages using the remaining part of the second logical address to obtain a memory address of one of the BNR pages, and searching said one BNR page for a BNR associated with the remaining one of the subparameters.

10. The invention of claim 9 wherein the data structure is incorporated into a data base management system comprising a processor, a main random access memory, and a secondary larger storage memory, and wherein the root page and root LPAM pages are maintained in the main memory, and the remaining portions of the data structure are maintained in the secondary memory.

* * * * *